United States Patent [19]

Nienstedt

[11] Patent Number: 4,733,437
[45] Date of Patent: Mar. 29, 1988

[54] APPARATUS AND METHOD FOR CUTTING DEEP-FROZEN FOODSTUFF

[76] Inventor: Heinz Nienstedt, Zum Nonnenberg 8a, D-4350 Recklinghausen, Fed. Rep. of Germany

[21] Appl. No.: 912,581
[22] PCT Filed: Dec. 7, 1985
[86] PCT No.: PCT/EP85/00685
   § 371 Date: Aug. 7, 1986
   § 102(e) Date: Aug. 7, 1986
[87] PCT Pub. No.: WO86/03441
   PCT Pub. Date: Jun. 19, 1986

[30] Foreign Application Priority Data

Dec. 13, 1984 [DE] Fed. Rep. of Germany ....... 3445472
Dec. 29, 1984 [DE] Fed. Rep. of Germany ....... 3447821
Apr. 6, 1985 [DE] Fed. Rep. of Germany ....... 3512488
Aug. 1, 1985 [DE] Fed. Rep. of Germany ....... 3527620

[51] Int. Cl.$^4$ .................................................. A22C 25/18
[52] U.S. Cl. .......................................... 17/52; 17/61; 83/425.3
[58] Field of Search ................. 17/52, 61; 83/425.3, 83/425.2

[56] References Cited

U.S. PATENT DOCUMENTS

| 463,255 | 11/1891 | Bicks | 83/425.3 |
|---|---|---|---|
| 777,976 | 12/1904 | Reinhold | 83/425.3 X |
| 1,316,026 | 9/1919 | Gamage | 17/61 |
| 2,148,782 | 2/1939 | Spang | 83/425.3 X |
| 4,193,272 | 3/1980 | Bernard . | |

FOREIGN PATENT DOCUMENTS 949495 2/1964 United Kingdom .

Primary Examiner—Willie G. Abercrombie
Attorney, Agent, or Firm—Spencer & Frank

[57] ABSTRACT

An apparatus and a method for cutting deep-frozen foodstuff, in particular fish, in the form of square plates 4 into a plurality of square rods 15. The apparatus consists of a circular saw which is provided above a closed table top 1, and on the shaft of which are clamped, between spacer disks 6, individual saw blades 5. With respect to the thickness of the plates 4, the circular saw blades 5 have a large diameter. Stiffening spacer disks 6 clamp circular saw blades 5 except for an outer rim corresponding to the thickness of the plate 4. By these measures, relatively thin circular saw blades 5 gain a sufficient stiffness at their outer rim. This arragement reduces cutting operations and results in a small amount of chipped foodstuff material. The chipped material is not lost for the final product since it remains above the closed table top 1 and is collected by a following pressure roll 9 and deposited on the upper surface of the rods 15.

18 Claims, 3 Drawing Figures

APPARATUS AND METHOD FOR CUTTING DEEP-FROZEN FOODSTUFF

BACKGROUND OF THE INVENTION

This invention basically relates to an apparatus and method for cutting deep-frozen foodstuff in the form of square bodies into a plurality of smaller square units by means of a multi-blade circular saw.

More specifically, the present invention relates to an apparatus for cutting deep-frozen foodstuff, in particular fish, in the form of square bodies such as plates into a plurality of smaller square units such as small rods, comprising a table on which the square bodies are shiftable by means of a conveyor means, a circular saw whose shaft is provided with a plurality of blades which are arranged in the moving path of the square bodies and which are clamped between stiffening disks, with the diameter of said the blades being large with respect to the thickness of the square bodies, as well as hold-down rolls engaging the upper side of the square bodies, in particular pressure rolls.

The invention further relates to a method for cutting deep-frozen foodstuff, in particular meat, fish and vegetables, in the form of square bodies, such as plates into smaller units, such as small rods, using a circular saw comprising one or several saw blades arranged in parallel adjacent relationship in front of which each body is shiftable in the forward direction on a table during the cutting operation.

Some foodstuff, such as fish, is deep frozen into blocks and then cut progressively into smaller square units, such as bars, plates and small rods. It is usual to use belt and circular saws for this purpose. For cutting the square plates into a plurality of square rods, devices of the above mentioned type are used.

In a prior apparatus of the above mentioned type (GB-PS No. 949 495), several circular saw blades are provided and arranged in parallel relationship to each other on a common shaft with their drive below the table on which the plates are shifted. In the table, parallel slots are provided through which the circular saw blades protrude. Since the producer wants to cut as many small rods as possible from the block, he will try to respect the prescribed minimum weight with as little loss as possible. This is only possible when the parts are cut into a precise square form, which requires stiff saw blades. However, the stiffness of a saw blade depends on its thickness. Consequently, a minimum thickness of the saw blades, the periphal edges of which are generally equipped with diamond chips, should be maintained. In an apparatus of the above mentioned type, circular saw blades are used which have a diameter of 125 mm and a thickness of 0.8 to 0.95 mm at the periphery.

Such devices present a number of drawbacks: When cutting with such thick saw blades, an important part of the foodstuff is chipped and is lost in weight if appropriate countermeasures are not taken. One of these prior measures consists of providing rollers which are disposed above the plates transported on the table and which collect a part of the chipped foodstuff centrifuged against them by the saw blades and convey the chipped foodstuff back to the surface of the plates cut into rods. This permits a reduction of the cutting loss. But a big part of the cut foodstuff goes under the table and is lost. Another drawback of prior devices is the output which is presently no longer sufficient. Presently, outputs are required of at least 100 cycles (plates to be cut) per minute. Such an output requires a 30 kw-motor for a saw of the above mentioned type with 20 to 24 saw blades making 8,000 revs per minute. For such a cutting performance of the prior device, there is produced an even bigger cutting loss, and furthermore there is also produced heat during the cutting operation which has to be compensated later by renewed freezing.

SUMMARY OF THE INVENTION

The present invention is based on the object to improve the apparatus and method of the above mentioned type in such a way that less cutting loss is produced.

According to the invention, this object is solved by the fact that the blades of the circular saw are located above the table plate or top which is closed i.e., is solid or contains no openings. In this arrangement only an outer edge of the blades corresponding to the thickness of the square bodies should protrude between the disks.

Due to the closed table plate (top), which includes recesses of a small depth for receiving the apexes of the saw blades, the total amount of the cut stuff remains on the table surface. Since the blades are arranged above the table plate, it is possible due to the stiffening spacer disks, to clamp them over a greater range than in an arrangement below the table in which the thickness of the table plate has also to be taken into account. This means that despite the larger diameter and the smaller blade thickness, a higher stiffness is achieved. The small blade thickness leads to little cutting loss and thus to reduced cutting work which is advantageous in many aspects. The reduced cutting work leads to less cooling loss. Consequently, later recooling is in general not necessary. Furthermore, loading of the bearings of the saw shaft is reduced, so that they may be dimensioned lighter. Finally, the saw can be operated with lower rotational speed and with less electric energy.

Practice has shown that when realizing the inventive teaching, it is possible to operate with saw blades the diameter of which is 1½ to 2 times larger than that of the above mentioned conventional saw blade. The thickness of the blades may be selected to be one third smaller than usual.

In order to recover as much as possible of the cut foodstuff, the downholders provided at the upper side of the table plate, designed as pressure rolls, act as collecting elements aginst which the cut foodstuff is projected and which press it onto the small square units. The downholders designed as pressure rolls are preferably provided in the wedges located between the upper side of the table plate and the circular saw blades in the transporting direction of the square bodies in front and behind the circular saw.

In the method according to the invention, the above object is solved by the features that the cutting operation is performed from above, and that the cut goods produced during cutting and transported and centrifuged away by the circular saw are collected above the circular saw and redeposited behind the circular saw onto the surface of the smaller units.

In the same way as in the apparatus, in the method the chipped goods also remain on the table plate or top on which the square bodies are conveyed. Consequently, the total amount of chipped goods, as far as it does not remain any way on the smaller units, may be easily collected and redeposited by appropriate measures onto the surface of the smaller units. Apart from the loss due to humidity vaporized during cutting, the recovery of chipped goods is perfect.

In order to perfectly guide the square bodies during the cutting operation, it is possible to provide, in addition to the downholders which are in particular pressure rolls, further downholders or hold-down devices consisting of spring loaded guide fingers extending between the blades. These guide fingers are preferably guided in peripheral grooves of the spacer disks.

According to another feature of the invention, there is provided, at the output side of the blades, a collecting roll or collecting tape for chipped foodstuff engaging the upper side of the bodies cut into small units. Preferably, the collecting roll is driven synchronously with the conveyer means.

Finally, for further recovery of chipped foodstuff, a collecting hood may be provided above the saw blades at the side turned away from the table. At or in the collecting hood, air jet nozzles are preferably arranged in such a way that their air blows the foodstuff collected by the collecting hood to the output of the circular saw. The collecting hood should be divided into individual chambers in which are arranged several, but preferably only one saw blade. This permits, in particular when using blowing air, improved recovery of chipped foodstuff.

When using an air jet, which helps to improve the recovery of chipped foodstuff, it is possible to realize a series of other advantageous measures. For instance, it is possible to add blending agents to the air jet. As the blending agent, water vapour or mist may be used for instance. By means of such blending agent, it is even possible to add the humidity lost during the cutting operation so that weight loss during cutting is further minimized. But it is also possible to add a spice to the air jet. The spice may be solid or liquid, for instance vinegar.

BRIEF DESCRIPTION OF THE DRAWINGS

The invention will be explained below in detail with references to the drawings wherein.

DETAILED DESCRIPTION OF THE PREFERRED EMBODIMENTS

Figure 1:
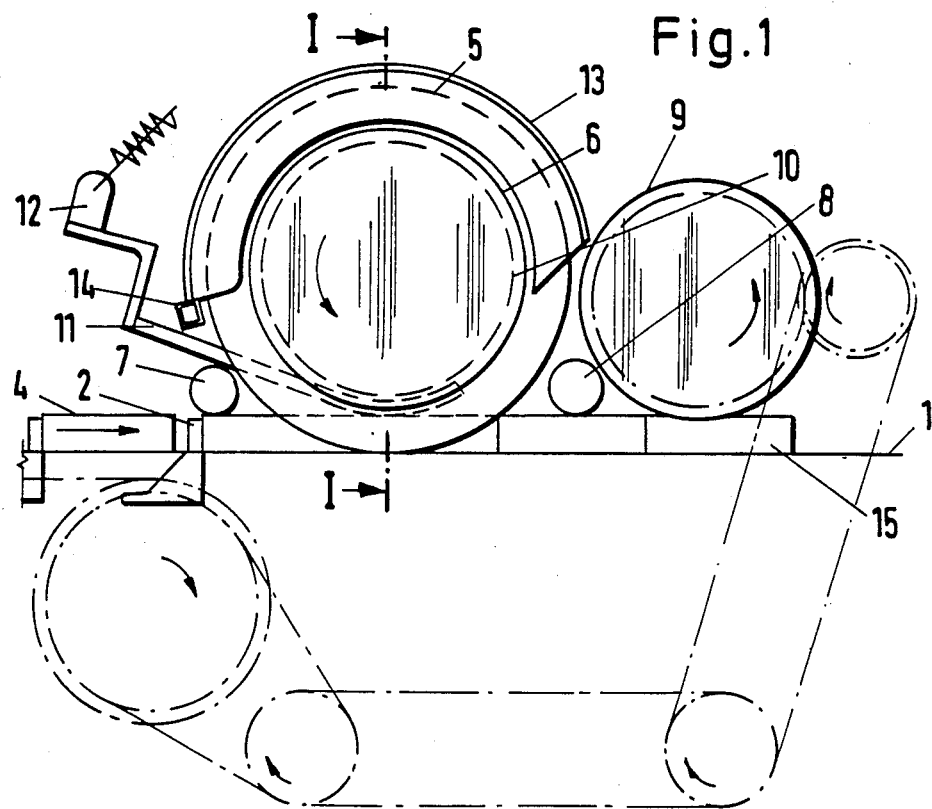
FIG. 1 is a schematic side elevation of a preferred embodiment of the apparatus according to the invention.
Figure 2:
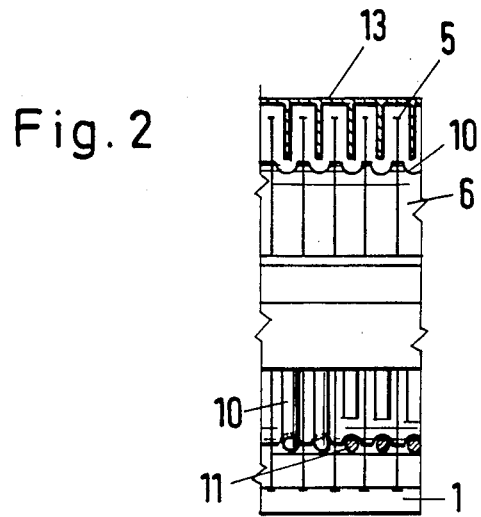
FIG. 2 is an axial sectional view along line I—I of FIG. 1.
Figure 3:
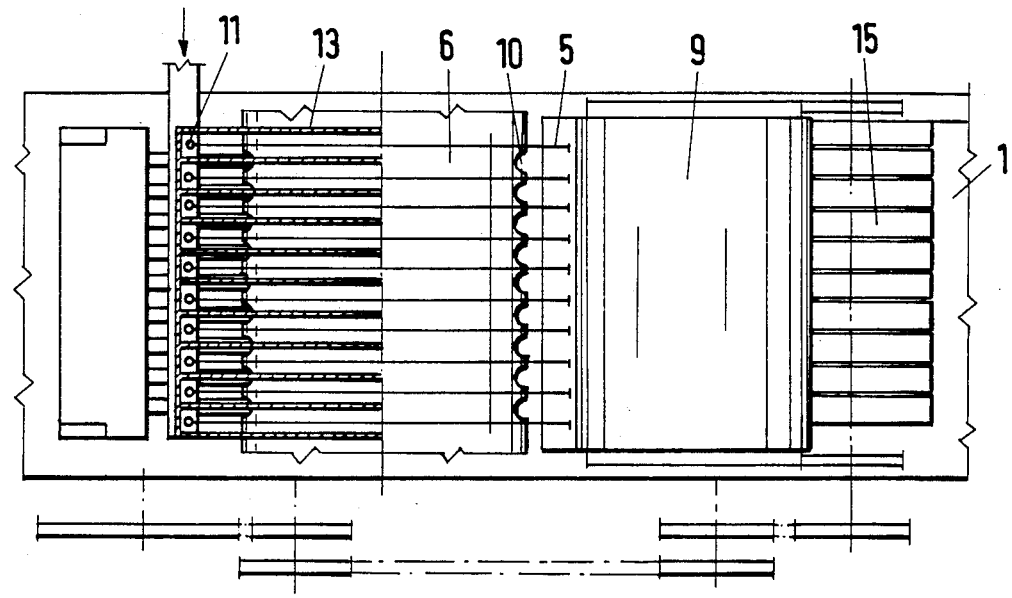
FIG. 3 is a top view of the apparatus shown in FIG. 1.

Referring now to the drawing figures, square elongated bodies, in particular plates 4, consisting of deep-frozen foodstuff, in particular fish, are flatly stacked in a vertical chute not represented in the drawing. Below the lower opening of said chute, a table top or plate 1 is provided. By means of a plurality of entrainment elements 2 supported by a circulating chain belt 3 of a conveyor device and extending through slots provided in table top 1 behind plates 4, said plates 4 are individually fed to the circular saw. The slots in the table top 1 end in front of the circular saw. This means that in the area of the circular saw, the table top 1 is closed, i.e., it contains no through openings or slots.

The circular saw consists of a plurality of individual blades 5 arranged on a common drive shaft and kept in spaced relationship by spacer disks 6. The spacer disks 6 extend in the radial direction so as to leave only a narrow free rim of blades 5, the width of which rim corresponds approximately to the thickness of plates 4. The apexes of saw blades 5 extend only over a small distance into shallow grooves provided in table top 1, thus allowing the blades 5 to perfectly cut plates 4.

In the conveying direction of plates 4, both in front of and behind the circular saw, small follower pressure rolls 7 and 8 are arranged in the wedges or wedge shaped areas formed by the upper side of the plates 4 and saw blades 5. The pressure roll 8 is followed by a larger pressure roll 9 driven synchronously with the chain belt 3 for the entrainment elements 2. The smaller pressure rolls 7,8 ensure that during the cutting operation the plates 4 are securely held on table top 1. For the same purpose fingers 11 extend between saw blades 5. Said fingers 11 are guided in grooves 10 formed on the peripheral surface of the spacer disks 6 and are supported by a spring loaded holder 12.

The larger pressure roll 9 not only serves to guide plates 4 cut into rods 15, but also to deposit and compress collected chipped material, or compress already deposited chipped material, on the surface of the rods 15. For collecting chipped material centrifuged by the saw blades 5, there is also provided a hood 13 enclosing the periphery of the saw blades 5 at the side turned away from the table top 1. In the hood 13, blowing nozzles 14 generate an air jet for conveying collected chipped material into the area of the pressure roll 9, thus allowing the latter to compress said chipped material on the surface of the cut rods 15.

The inventive apparatus permits the cutting of deep-frozen foodstuff with very little chipping loss and without substantial loss of coldness while respecting a predetermined geometry. The unavoidable amount of chipped material produced is substantially recovered and fed back to the final product.

What is claimed is:

1. In an apparatus for cutting deep-frozen foodstuff, in particular fish, in the form of square bodies, such as plates, into a plurality of smaller square units such as small rods, comprising a table on which the square bodies are shiftable by means of a conveyor means, a circular saw having a shaft which is provided with a plurality of saw blades arranged in the moving path of the square bodies and clamped between stiffening disks, with the diameter of said blades being large with respect to the thickness of the square bodies to be cut, and hold-down pressure rolls engaging the upper surface of the square bodies; the improvement wherein: the blades (5) of the circular saw are located above the table (1), at least the portion of the table top beneath the circular saw is closed, and means, disposed at least in part at the periphery of said saw blades, are provided for collecting particles of foodstuff produced during a cutting operation and for depositing the collected particles behind the saw and on the upper surface of cut smaller units.

2. Apparatus as defined in claim 1, wherein only an outer edge of the blades (5) corresponding to the thickness of the square bodies being cut (4) protrudes from between the stiffening disks (6).

3. Apparatus as defined in claim 1, wherein said hold-down pressure rolls (7,8) are provided in the wedge shaped areas formed between the upper surface of the square bodies (4) and the edge of said blades (5) of the circular saw in the moving direction of the square bodies (4), both in front of and behind the circular saw.

4. Apparatus as defined in claim 1, further comprising a further hold-down device for the square bodies including spring loaded guide fingers (11) extending between the saw blades (5).

5. Apparatus as defined in claim 4, wherein said guide fingers (11) are guided in grooves (10) formed on the periphery of the stiffening disks (6).

6. Apparatus as defined in claim 1, wherein said means for collecting includes a collecting roll provided at the output side of the circular saw and engaging the upper surface of square bodies cut into the smaller square units (15).

7. Apparatus as defined in claim 6, wherein said collecting roll (9) is driven synchronously with the conveyor means (2,3).

8. Apparatus as defined in claim 1, wherein said means for collecting includes a collecting hood provided over the portion of the periphery of the blades (5) of the circular saw facing away from said top of said table.

9. Apparatus as defined in claim 8, wherein said collecting hood (8) is provided with air jet nozzles (14) arranged such that their air blows the foodstuff particles collected by said collecting hood (13) to the output side of the circular saw.

10. Apparatus as defined in claim 8, wherein said collecting hold (13) is subdivided into individul chambers.

11. Apparatus as defined in claim 10, wherein each said saw blade extends into a respective one of said individual chambers.

12. In a method for cutting deep-frozen foodstuff, in particular meat, fish and vegetables including providing deep-frozen foodstuff in the form of square bodies such as plates, and cutting the square bodies into smaller units such as small rods, by means of a circular saw comprising several saw blades arranged in parallel adjacent relationship in front of which each square body is shiftable in the forward direction on a table during the cutting operation; the improvement wherein said step of cutting is performed entirely from above the table, and further comprising the steps of collecting the cut foodstuff particles which are transported and centrifuged away by the circular saw above the circular saw, and depositing the collected particles behind the circular saw on the surface of the cut smaller units.

13. Method as defined in claim 11, wherein said step of depositing includes transporting the collected cut foodstuff particles by means of an air jet to the depositing place.

14. Method as defined in claim 12, wherein the air jet is admixed with a blending agent.

15. Method as defined in claim 13, wherein the blending agent is water vapour or mist.

16. Method as defined in claim 13, wherein the blending agent is a spice.

17. Apparatus as defined in claim 9, wherein said collecting hood (13) is subdivided into individual chambers.

18. Apparatus as defined in claim 17, wherein each said saw blade extends into a respective one of said individual chambers.

* * * * *